(12) United States Patent
Zhang et al.

(10) Patent No.: US 7,328,274 B2
(45) Date of Patent: *Feb. 5, 2008

(54) QUALITY OF SERVICE IN A GATEWAY

(75) Inventors: Shujin Zhang, San Carlos, CA (US); Tianji Jiang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/496,850

(22) Filed: Jul. 31, 2006

(65) Prior Publication Data
US 2006/0265514 A1  Nov. 23, 2006

Related U.S. Application Data

(63) Continuation of application No. 10/256,787, filed on Sep. 26, 2002, now Pat. No. 7,130,917.

(51) Int. Cl.
*G06F 15/16* (2006.01)
*G06F 15/173* (2006.01)

(52) U.S. Cl. ............ 709/234; 709/223; 709/224; 709/226; 370/230; 370/401; 715/736

(58) Field of Classification Search ........ 709/223–226, 709/232–235; 370/229–232, 235, 400–401; 715/734–736

See application file for complete search history.

(56) References Cited

U.S. PATENT DOCUMENTS

| 5,313,454 | A | 5/1994 | Bustini et al. ............... 370/13 |
| 5,666,353 | A | 9/1997 | Klausmeier et al. ........ 370/230 |
| 6,047,322 | A | 4/2000 | Vaid et al. ................... 709/224 |
| 6,424,624 | B1 | 7/2002 | Galand et al. ............. 370/231 |
| 6,425,003 | B1 | 7/2002 | Herzog et al. ............. 709/223 |
| 6,463,068 | B1 | 10/2002 | Lin et al. ................... 370/414 |
| 7,130,917 | B2* | 10/2006 | Zhang et al. ............... 709/234 |
| 2002/0016839 | A1* | 2/2002 | Smith et al. ............... 709/224 |
| 2003/0149762 | A1* | 8/2003 | Knight et al. ............. 709/224 |

FOREIGN PATENT DOCUMENTS

| EP | 1 021 015 | 7/2000 |
| WO | WO 01/01293 | 1/2001 |

* cited by examiner

*Primary Examiner*—Bharat Barot
(74) *Attorney, Agent, or Firm*—Thelen, Reid, Brown, Raysman & Steiner LLP; David B. Ritchie

(57) ABSTRACT

A host object representing a user, a service object representing a service, and a connection object linking the two may be utilized in order to provide Quality of Service (QoS). The host object and/or connection object may contain a provisioning scheme defining a limit on traffic, which can be provided through either a local or remote programming mechanism. When traffic flows through the host object and/or connection object, the appropriate provisioning scheme is utilized to determine which packets to discard.

17 Claims, 8 Drawing Sheets

QUALITY OF SERVICE IN A GATEWAY

CROSS-REFERENCE TO RELATED APPLICATION

This application is a continuation of U.S. patent application Ser. No. 10/256,787, entitled "Quality of Service in a Gateway" by Shujin Zhang and Tianji Jiang, filed on Sep. 26, 2002, now U.S. Pat. No. 7,130,917.

FIELD OF THE INVENTION

The present invention relates to the field of computer network gateways. More specifically, the present invention relates to a solution to provide quality of service (QoS) to gateway users through a traffic provisioning scheme.

BACKGROUND OF THE INVENTION

Subscriber aggregation systems allow computer network users to simultaneously connect to multiple service destination networks. In order to obtain the services provided by different service networks, a subscriber will exchange data or control packets with the networks. This traffic may be received from the subscriber by a gateway in the upstream direction, then received from the service network by the gateway in the downstream direction.

Through the user of a specialized gateway, a subscriber may dynamically choose one or more types of services. Each type of service may have its own bandwidth requirements, as well as different pricing levels, in order to provide corresponding quality of service levels to its subscribers. Thus the bandwidth consumed by a subscriber in either the upstream or downstream direction may fluctuate with the services selected. Accordingly, the price a subscriber would pay for its subscription would also vary. For example, a subscriber may pay $19.95 a month to an ISP for basic service, while paying $39.95 for premier service. Additionally, sometimes a user may simultaneously subscribe to multiple services offered by an ISP, such as video service and Internet access, at different prices. The video service usually requires the higher bandwidth and the ISP has to provision the transmission media, such as digital subscriber line (DSL) to the acceptable high speed. Unfortunately, this allows the user to enjoy Internet at a higher speed as well, and an ISP may wish to charge more money for high speed Internet than high speed video services. These may collectively be known as Quality of Service (QoS).

The most common approach to handling these problems has been to use an Asynchronous Transfer Mode (ATM) virtual circuit (VC) for each subscriber and to set a limit on the VC. This is known as traffic provisioning on a per subscriber line basis. However, there are several limitations to this approach. First, there may be more than one user on a subscriber line. For example, when the subscriber is a small company, there will be multiple employees who share the same line. This approach cannot differentiate between the users. Second, a user may have access to more than one service provider. Each service provider may wish to set its own limit. For example, one service provider may set a 1.5 Mb limit and another 0.5 Mb. This approach cannot apply different limits to different services, it is only able to apply an aggregated limit of 2 Mb to the VC as a whole.

What is needed is a solution that overcomes these limitations.

BRIEF DESCRIPTION

A host object representing a user, a service object representing a service, and a connection object linking the two may be utilized in order to provide Quality of Service (QoS). The host object and/or connection object may contain a provisioning scheme defining a limit on traffic, which can be provided through either a local or remote programming mechanism. When traffic flows through the host object and/or connection object, the appropriate provisioning scheme is utilized to determine which packets to discard.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
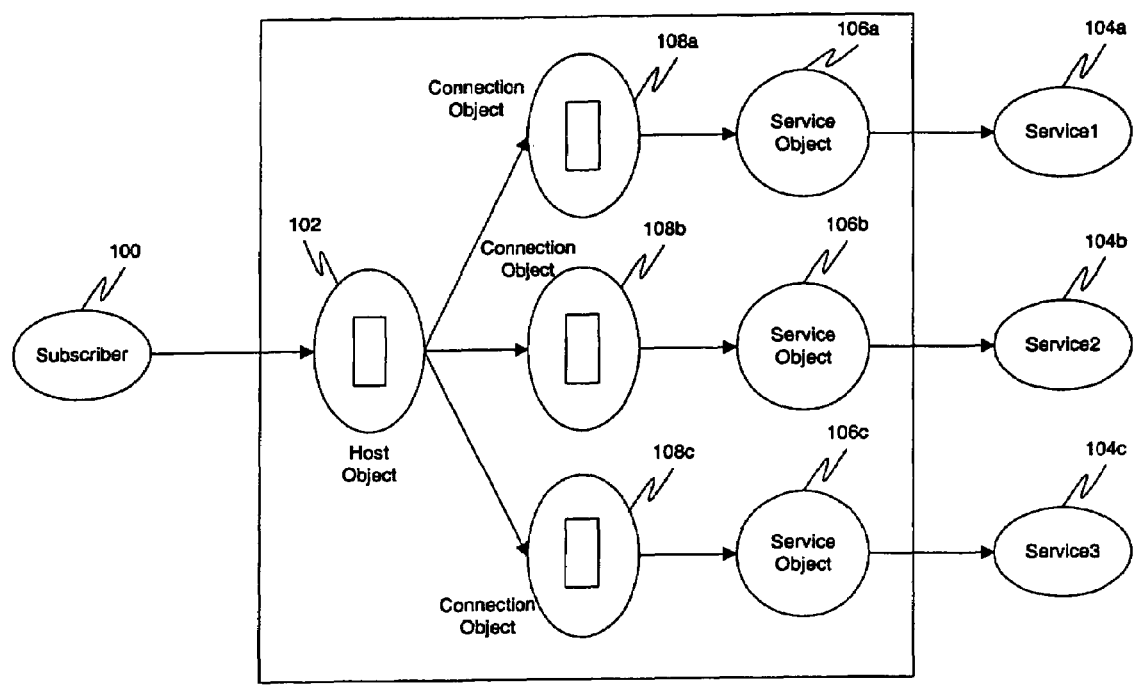
FIG. 1 is a diagram illustrating a gateway architecture in accordance with a specific embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A host object representing a user, a service object representing a service, and a connection object linking the two may be utilized in order to provide Quality of Service (QoS). In a specific embodiment of the present invention, when a user logs in, the gateway may create the host object. The user can then log in, either sequentially or concurrently, to one or more subscribed services. When a user logs into a subscribed service, a service object may be created to describe the service (unless the service object has already been created due to actions of other subscribers). A connection object may then be created to link the user's host object with the service object. A packet from a user to the Internet may then flow from the user to the host object, then to the connection object, then to a service object, and then to the Internet. A packet from the Internet to the user may flow in the reverse order.

In a specific embodiment of the present invention, a provisioning scheme may be placed inside the host object and/or the connection object. The provisioning scheme for a particular service may first be stored in a service profile, and then copied to each connection object created that is linked to the service. The provisioning scheme may monitor the traffic rate and discard certain packets when the rate exceeds the limit accorded to packets meeting criteria defined in the scheme. That is an example of a policing scheme. However, other provisioning schemes such as shaping may also be applied:

Thus, several different provisioning cases may be implemented using the present invention. These include:

1. Aggregated Provisioning. If a user has subscribed to multiple service, the network access provider can set a provisioning scheme on the host object so that the user cannot send or receive traffic at a higher rate than the limits.

2. Service Provisioning. Each service provider can set its own limit by set a provisioning scheme in the appropriate service object.

3. Per user and per service provisioning. The network access provider can set the limits on the user and the service provider can also set the limits on each service. For example, the limit on the user may be set at 2 Mb. The limit on service A may be set at 1.5 Mb and the limit on service B at 1 Mb. If the user subscribes to both services at the same time, the user will be limited by both the service limits and the total 2 Mb limit. If the user only subscribes to one service, the user will only be limited by the total 2 Mb limit as it is higher than the service limit.

FIG. 1 is a diagram illustrating a gateway architecture in accordance with a specific embodiment of the present invention. A subscriber 100 may have an associated host object 102. The user may be subscribed to three services 104a, 104b, 104c. Each service may have a corresponding service object 106a, 106b, 106c. A connection object 108a, 108b, 108c may associated each service object 106a, 106b, 106c with the appropriate host object 102.

An additional benefit of a specific embodiment of the present invention is that the Remote Access Dial-In User Service (RADIUS) access control protocol may be utilized to automate configuration of the provisioning schemes. In the past, any provisioning scheme had to be manually configured through a command line interface (CLI). By modifying the user profile and service profile to include an attribute describing the provisioning parameters, the provisioning schemes may be easily modified though a remote subscriber management protocol such as RADIUS. This may include information on upstream bandwidth, upstream normal burst size, upstream excess burst size, downstream bandwidth, downstream burst size, and downstream excess burst size. In the user profile, this defines the average bandwidth the user is entitled to obtain and the normal/excess burst tolerance the user can have. In the service profile, this defines the average rate a service has to achieve and the normal excess/burst size the service can tolerate to provide corresponding quality of service.

Figure 2:
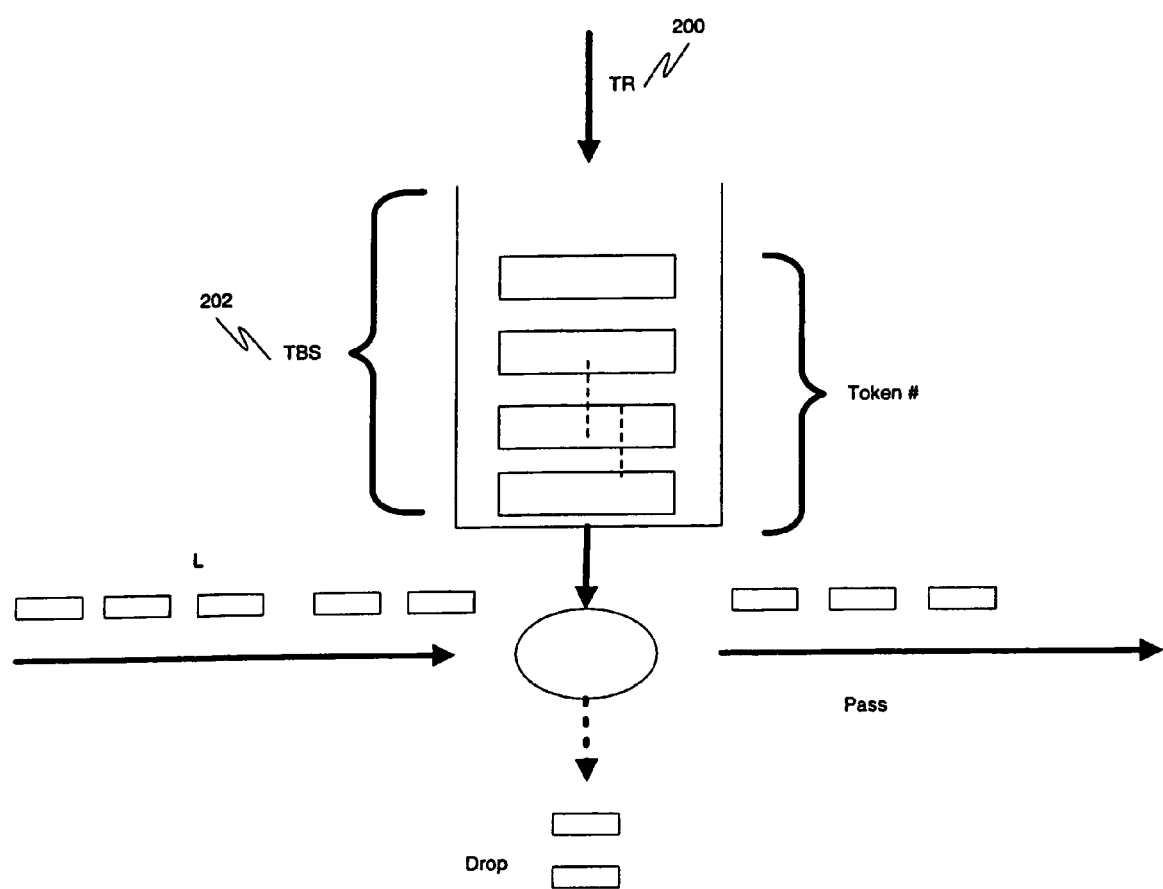
FIG. 2 is a diagram illustrating token bucket provisioning in accordance with a specific embodiment of the present invention.

In a specific embodiment of the present invention, the provisioning scheme may be implemented as a token bucket mechanism. FIG. 2 is a diagram illustrating token bucket provisioning in accordance with a specific embodiment of the present invention. A token rate TR 200 is set, which corresponds to either the aggregated bandwidth a subscriber is entitled to achieve in the per user provisioning or the bandwidth an individual service requires to provide acceptable quality in the per user per service provisioning. A token bucket size or the normal burst size TBS 202 may be used to restrict the burst size a stream of traffic may reach.

When a packet with length L, either from the upstream or downstream direction, arrives at the policer (whether in the host object or the connection object), the packet may be passed on if its token bucket has enough tokens (>=L) and the number of tokens in the bucket will be updated accordingly. If the bucket does not have sufficient tokens (<L), the packet will be dropped and the number of tokens in the bucket will not be updated. Thus:

When a packet with length L arrives at the gateway,

Update token bucket: Token#=Min (Token#+ TR*Elapsed_time_since_last_update, TBS),

| If | (Token # >=L) then |
|---|---|
|  | Pass the packet, |
|  | Update token bucket: Token# = Token# − L; |
| Else |  |
|  | Drop the packet without updating token bucket |

When the optional parameter, extended burst size ETBS, is set, it should be equal to or greater than TBS. When ETBS is equal to TBS, the provisioning scheme is the token bucket scheme. When ETBS is greater than TBS, the extended burst limit may be applied. Unlike a standard token bucket scheme, a token bucket with an extended burst size allows a stream to borrow more tokens. The need for a token bucket with extended burst capability is not to immediately enter into a tail-drop scenario such as the standard token bucket, but rather to gradually drop packets in a more random early detection (RED)-like fashion.

The scheme may make use of the comparison results among actual debt, compound debt, and extended burst size to determine the provisioning result of a packet. Actual debt is a count of how many tokens the flow has currently borrowed. Compounded debt is the sum of all actual debt since the last time a packet was dropped. If the compounded debt is greater than the extended burst size, the packet would be dropped. After the dropping, the compounded debt is effectively set to zero, and a new value will be computed the next time a new packet is dropped. If the actual debt is greater than the extended burst value, all packets will be dropped until the actual debt is reduced through accumulation of tokens in the token bucket. Dropped packets do not count against any rate or burst limit. That is, when packet is dropped, no tokens are removed from the token bucket.

Figure 3:
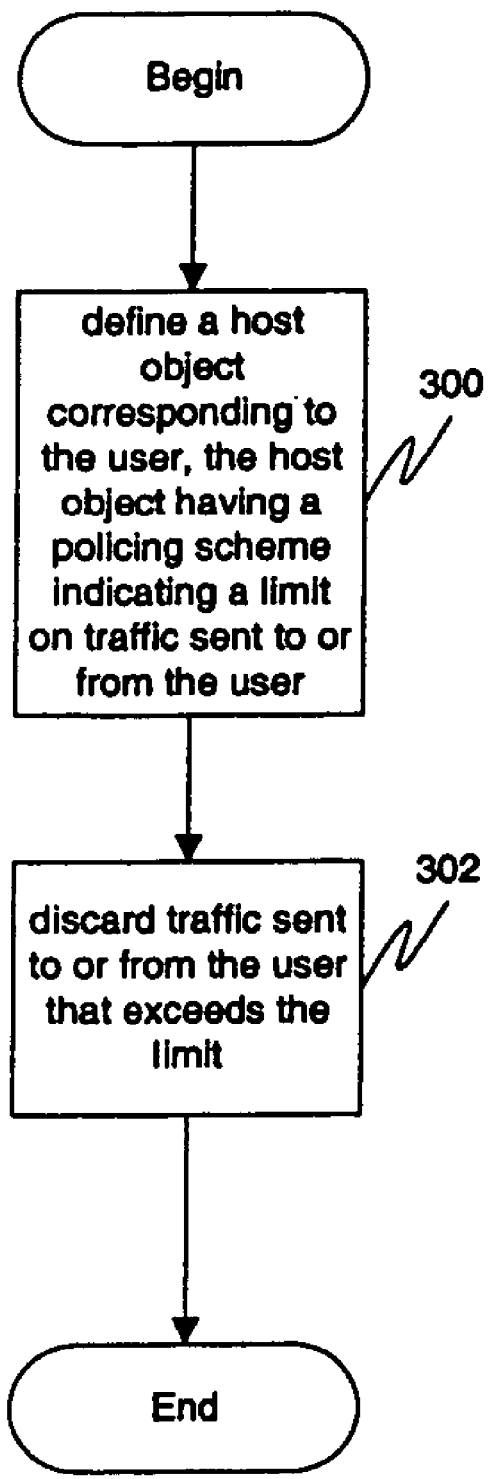
FIG. 3 is a flow diagram illustrating a method for providing quality of service for a user in a gateway in accordance with a specific embodiment of the present invention.

FIG. 3 is a flow diagram illustrating a method for providing quality of service for a user in a gateway in accordance with a specific embodiment of the present invention. At 300, a host object corresponding to the user is defined, the host object having a provisioning scheme indicating a limit on traffic sent to or from the user. This may occur when a user logs in. The host object may be defined using a user profile having an attribute describing provisioning parameters. These parameters may include upstream bandwidth, upstream normal burst size, upstream excess burst size, downstream bandwidth, downstream normal burst size and downstream excess burst size. The provisioning scheme may be implemented as token bucket provisioning. At 302, traffic sent to or from the user that exceeds the limit is discarded.

Figure 4:
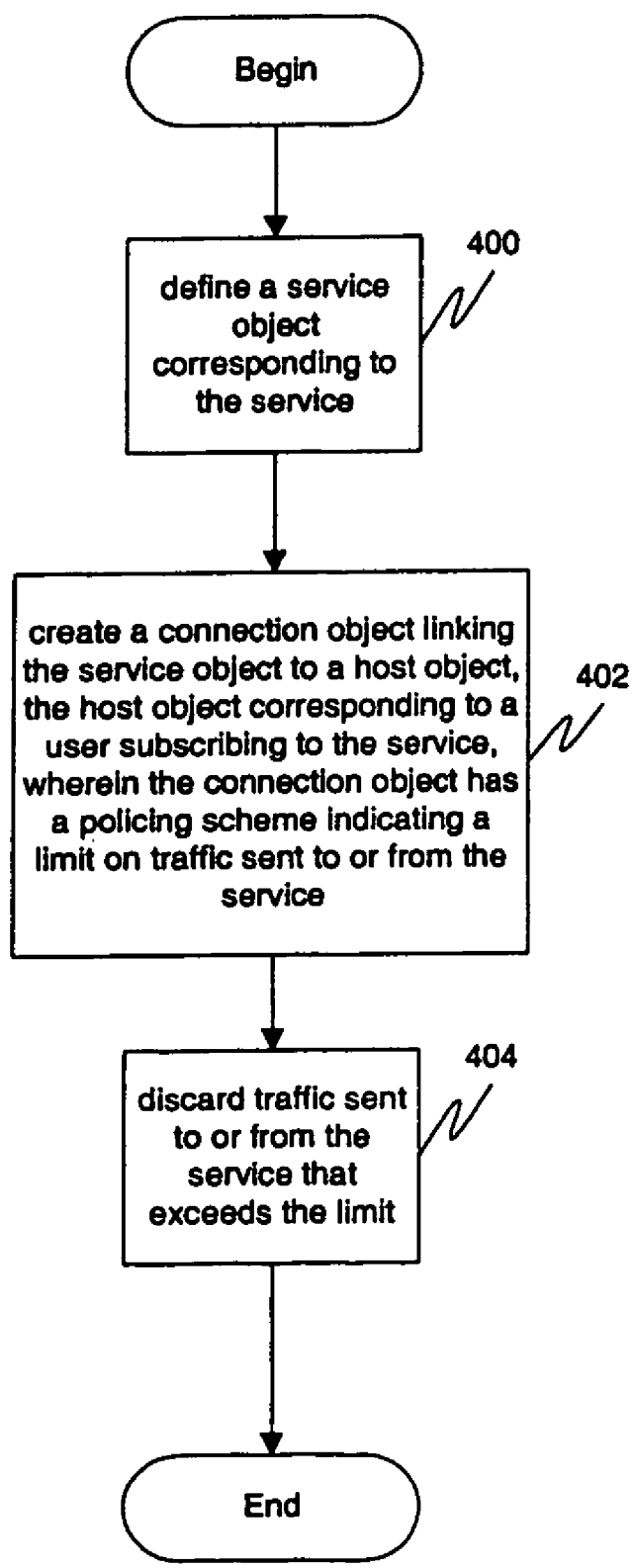
FIG. 4 is a flow diagram illustrating a method for providing quality of service for a service in a gateway in accordance with a specific embodiment of the present invention.

FIG. 4 is a flow diagram illustrating a method for providing quality of service for a service in a gateway in accordance with a specific embodiment of the present invention. At 400, a service object corresponding to the service is defined. This may occur when a user logs in to the service. At 402, a connection object linking the service object to a host object is created, the host object corresponding to a user subscribing to the service, wherein the connection object has a provisioning scheme indicating a limit on traffic sent to or from the service. The service object may be defined using a service profile having an attribute describing provisioning parameters. These parameters may include upstream bandwidth, upstream normal burst size, upstream excess burst size, downstream bandwidth, downstream normal burst size and downstream excess burst size. The provisioning scheme may be implemented as token bucket provisioning. At 404, traffic sent to or from the service that exceeds the limit is discarded.

Figure 5:
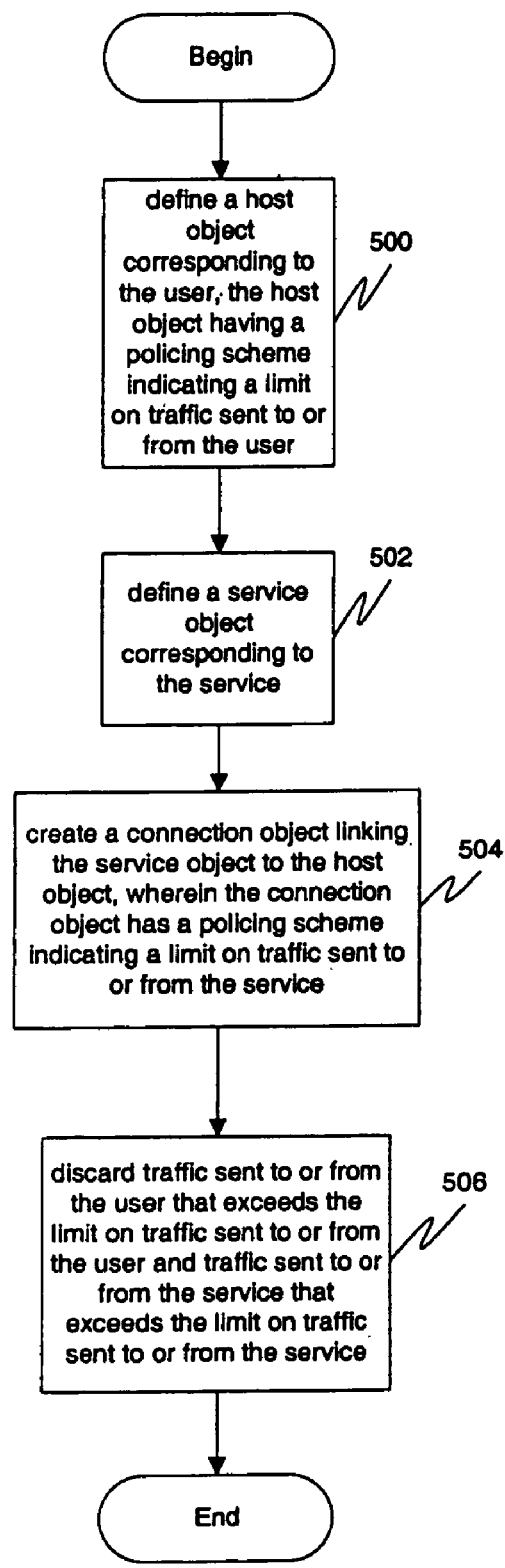
FIG. 5 is a flow diagram illustrating a method for providing quality of service for a user subscribing to one or more services in a gateway in accordance with a specific embodiment of the present invention.

FIG. 5 is a flow diagram illustrating a method for providing quality of service for a user subscribing to one or more services in a gateway in accordance with a specific embodiment of the present invention. At 500, a host object corresponding to the user is defined, the host object having a provisioning scheme indicating a limit on traffic sent to or from the user. This may occur when a user logs in. The host object may be defined using a user profile having an attribute describing provisioning parameters. These parameters may include upstream bandwidth, upstream normal burst size, upstream excess burst size, downstream bandwidth, downstream normal burst size and downstream excess burst size. The provisioning scheme may be implemented as token bucket provisioning. At 502, a service object corresponding to the service is defined. This may occur when a user logs in to the service. At 504, a connection object linking the service object to the host object is created, wherein the connection object has a provisioning scheme indicating a limit on traffic sent to or from the service. The service object may be defined using a service profile having an attribute describing provisioning parameters. These parameters may include upstream bandwidth, upstream normal burst size, upstream excess burst size, downstream bandwidth, downstream normal burst size and downstream excess burst size. The provisioning scheme may be implemented as token bucket provisioning. At 506, traffic sent to or from the user that exceeds the limit on traffic sent to or from the user and traffic sent to or from the service that exceeds the limit on traffic sent to or from the service is discarded.

Figure 6:
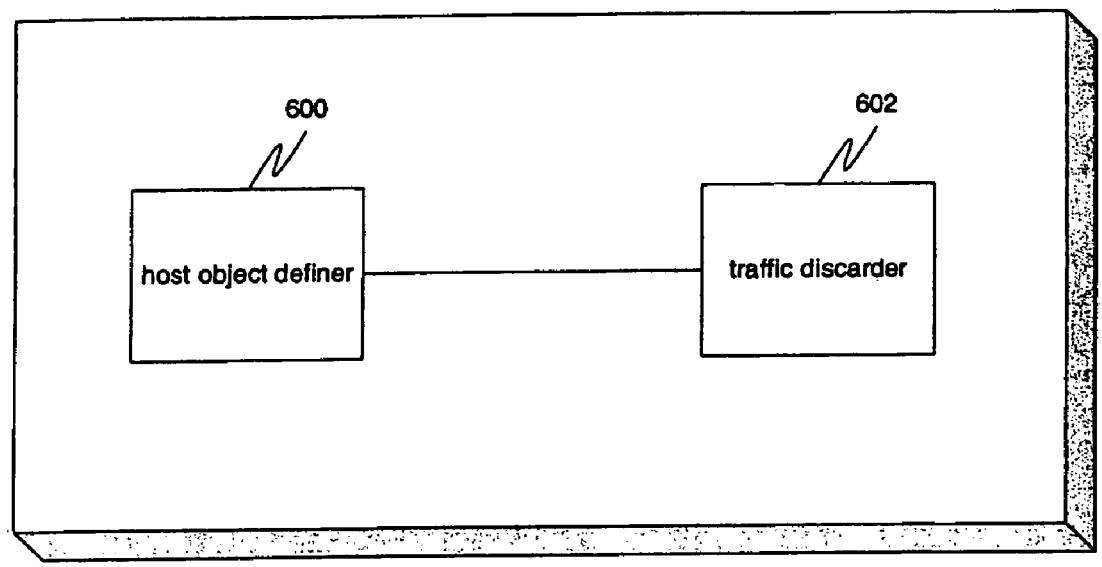
FIG. 6 is a block diagram illustrating a gateway for providing quality of service for a user in accordance with a specific embodiment of the present invention.

FIG. 6 is a block diagram illustrating a gateway for providing quality of service for a user in accordance with a specific embodiment of the present invention. A host object definer 600 defines a host object corresponding to the user, the host object having a provisioning scheme indicating a limit on traffic sent to or from the user. This may occur when a user logs in. The host object may be defined using a user profile having an attribute describing provisioning parameters. These parameters may include upstream bandwidth, upstream normal burst size, upstream excess burst size, downstream bandwidth, downstream normal burst size and downstream excess burst size. The provisioning scheme may be implemented as token bucket provisioning. A traffic discarder 602 coupled to the host object definer 600 may discard traffic sent to or from the user that exceeds the limit.

Figure 7:
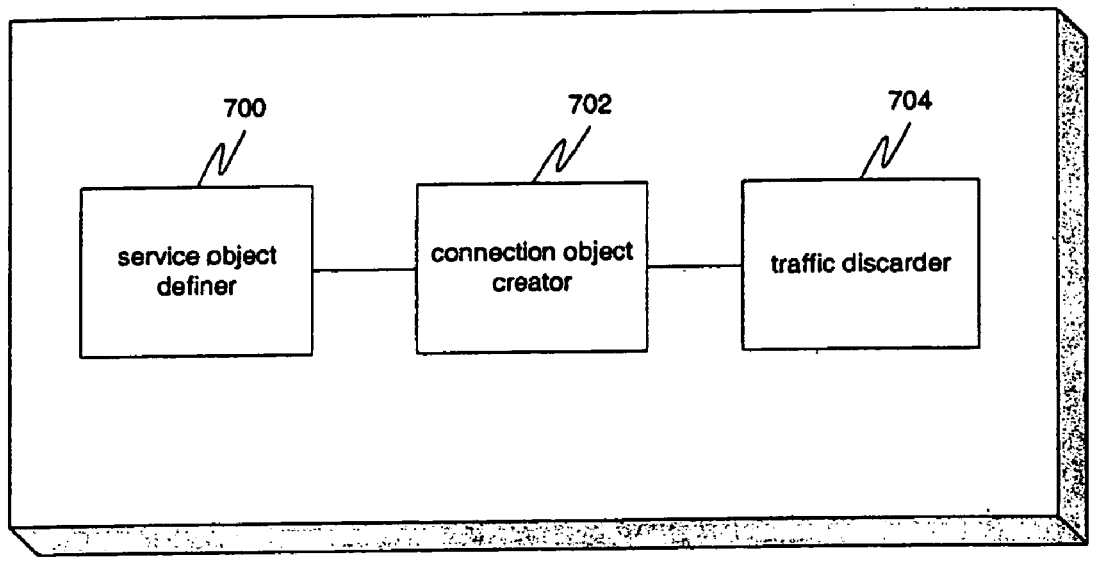
FIG. 7 is a block diagram illustrating a gateway for providing quality of service for a service in accordance with a specific embodiment of the present invention.

FIG. 7 is a block diagram illustrating a gateway for providing quality of service for a service in accordance with a specific embodiment of the present invention. A service object definer 700 defines a service object corresponding to the service. This may occur when a user logs in to the service. A connection object creator 702 coupled to the service object definer 700 may create a connection object linking the service object to a host object, the host object corresponding to a user subscribing to the service, wherein the connection object has a provisioning scheme indicating a limit on traffic sent to or from the service. The service object may be defined using a service profile having an attribute describing provisioning parameters. These parameters may include upstream bandwidth, upstream normal burst size, upstream excess burst size, downstream bandwidth, downstream normal burst size and downstream excess burst size. The provisioning scheme may be implemented as token bucket provisioning. A traffic discarder 704 coupled to the connection object creator 702 may discard traffic sent to or from the service that exceeds the limit.

Figure 8:
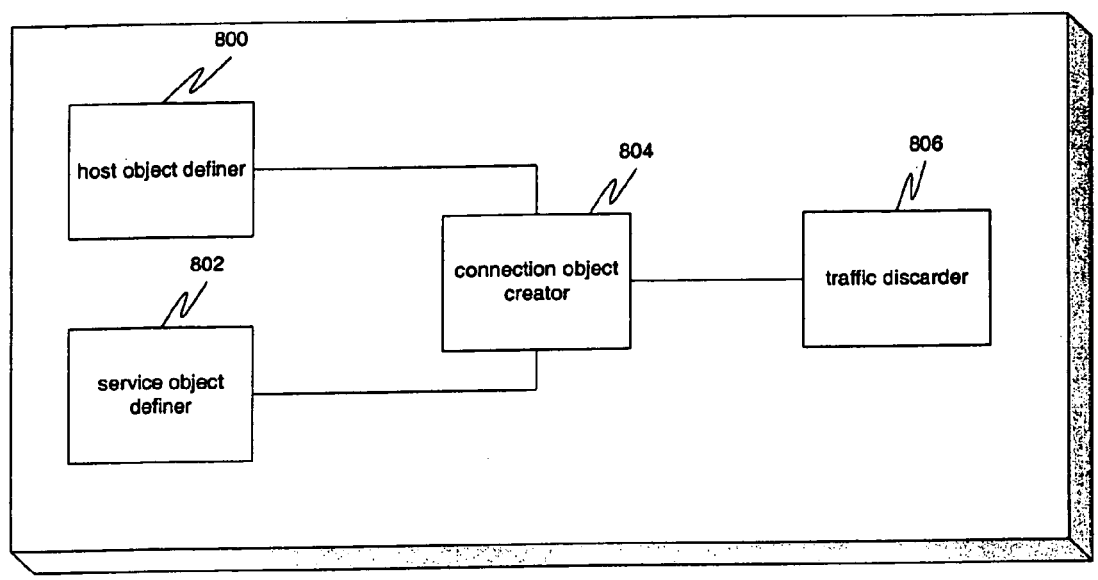
FIG. 8 is a block diagram illustrating a gateway for providing quality of service for a user subscribing to one or more services in accordance with a specific embodiment of the present invention.

FIG. 8 is a block diagram illustrating a gateway for providing quality of service for a user subscribing to one or more services in accordance with a specific embodiment of the present invention. A host object definer 800 may define a host object corresponding to the user, the host object having a provisioning scheme indicating a limit on traffic sent to or from the user. This may occur when a user logs in. The host object may be defined using a user profile having an attribute describing provisioning parameters. These parameters may include upstream bandwidth, upstream normal burst size, upstream excess burst size, downstream bandwidth, downstream normal burst size and downstream excess burst size. The provisioning scheme may be implemented as token bucket provisioning. A service object definer 802 may define a service object corresponding to the service. This may occur when a user logs in to the service. A connection object creator 804 coupled to the host object definer 800 and to the service object definer 802 may create a connection object linking the service object to the host object, wherein the connection object has a provisioning scheme indicating a limit on traffic sent to or from the service. The service object may be defined using a service profile having an attribute describing provisioning parameters. These parameters may include upstream bandwidth, upstream normal burst size, upstream excess burst size, downstream bandwidth, downstream normal burst size and downstream excess burst size. The provisioning scheme may be implemented as token bucket provisioning. A traffic discarder 806 coupled to the host object definer 800 and to the connection object creator 804 may discard traffic sent to or from the user that exceeds the limit on traffic sent to or from the user and traffic sent to or from the service that exceeds the limit on traffic sent to or from the service.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An apparatus comprising:
a host object data structure definer configured to define a host object data structure corresponding uniquely to a user when a user logs in, said host object data structure having a provisioning scheme indicating a limit on traffic sent to or from said user; and
a traffic discarder coupled to said host object data structure definer and configured to discard traffic sent to or from said user that exceeds said limit.

2. An apparatus comprising:
a host object data structure definer configured to define a host object data structure corresponding uniquely to a user, said host object data structure having a provisioning scheme indicating a limit on traffic sent to or from said user, said host object data definer further configured to define said host object data structure using a user profile having an attribute describing provisioning parameters; and
a traffic discarder coupled to said host object data structure definer and configured to discard traffic sent to or from said user that exceeds said limit.

3. The apparatus of claim 2 wherein said provisioning parameters include upstream bandwidth, upstream normal burst size, upstream excess burst size, downstream bandwidth, downstream normal burst size, and downstream excess burst size.

4. An apparatus comprising:
a host object data structure definer configured to define a host object data structure corresponding uniquely to a user, said host object data structure having a provisioning scheme indicating a limit on traffic sent to or from said user, said provisioning scheme implemented as token bucket provisioning; and
a traffic discarder coupled to said host object data structure definer and configured to discard traffic sent to or from said user that exceeds said limit.

5. An apparatus comprising:
a host object data structure definer configured to define a host object data structure corresponding uniquely to a user, said host object data structure having a provisioning scheme indicating a limit on traffic sent to or from said user; and
a traffic discarder coupled to said host object data structure definer and configured to discard traffic sent to or from said user that exceeds said limit, said apparatus further configured to further receive said provisioning scheme through a remote subscriber management system.

6. An apparatus comprising:
a host object data structure definer configured to define a service object data structure corresponding uniquely to a service when a user logs in to said service;
a connection object data structure creator coupled to said service object data structure definer and configured to create a connection object data structure linking said service object data structure to a host object data structure, said host object data structure corresponding uniquely to a user subscribing to said service, wherein said connection object data structure has a provisioning scheme indicating a limit on traffic sent to or from said service; and
a traffic discarder coupled to said connection object data structure creator and configured to discard traffic sent to or from said service that exceeds said limit.

7. An apparatus comprising:
a service object data structure definer configured to define a service object data structure corresponding uniquely to a service;
a connection object data structure creator coupled to said service object data structure definer and configured to create a connection object data structure linking said service object data structure to a host object data structure, said host object data structure corresponding uniquely to a user subscribing to said service, wherein said connection object data structure has a provisioning scheme indicating a limit on traffic sent to or from said service, said connection object data structure creator further configured to create said connection object data structure using a service profile having an attribute describing provisioning parameters; and
a traffic discarder coupled to said connection object data structure creator and configured to discard traffic sent to or from said service that exceeds said limit.

8. The apparatus of claim 7 wherein said provisioning parameters include upstream bandwidth, upstream normal burst size, upstream excess burst size, downstream bandwidth, downstream normal burst size, and downstream excess burst size.

9. An apparatus comprising:
a service object data structure definer configured to define a service object data structure corresponding uniquely to a service;
a connection object data structure creator coupled to said service object data structure definer and configured to create a connection object data structure linking said service object data structure to a host object data structure, said host object data structure corresponding uniquely to a user subscribing to said service, wherein said connection object data structure has a provisioning scheme indicating a limit on traffic sent to or from said service, said provisioning scheme implemented as token bucket provisioning; and
a traffic discarder coupled to said connection object data structure creator and configured to discard traffic sent to or from said service that exceeds said limit.

10. An apparatus comprising:
a service object data structure definer configured to define a service object data structure corresponding uniquely to a service;
a connection object data structure creator coupled to said service object data structure definer and configured to create a connection object data structure linking said service object data structure to a host object data structure, said host object data structure corresponding uniquely to a user subscribing to said service, wherein said connection object data structure has a provisioning scheme indicating a limit on traffic sent to or from said service; and a traffic discarder coupled to said connection object data structure creator and configured to discard traffic sent to or from said service that exceeds said limit, said apparatus further configured to receive said provisioning scheme through a remote subscriber management system.

11. An apparatus comprising:

a host object data structure definer configured to define a host object data structure corresponding uniquely to a user when a user logs in, said host object data structure having a provisioning scheme indicating a limit on traffic sent to or from said user;

a service object data structure definer configured to define a service object data structure corresponding uniquely to a service;

a connection object data structure creator coupled to said host object data structure definer and said service object data structure definer and configured to create a connection object data structure linking said service object data structure to a host object data structure, said host object data structure corresponding uniquely to a user subscribing to said service, wherein said connection object data structure has a provisioning scheme indicating a limit on traffic sent to or from said service; and a traffic discarder coupled to said host object data structure definer and said connection object data structure creator and configured to discard traffic sent to or from said service that exceeds said limit.

12. An apparatus comprising:

a host object data structure definer configured to define a host object data structure corresponding uniquely to a user, said host object data structure having a provisioning scheme indicating a limit on traffic sent to or from said user, said host object data structure definer further configured to define said host object data structure using a user profile having an attribute describing provisioning parameters;

a service object data structure definer configured to define a service object data structure corresponding uniquely to a service;

a connection object data structure creator coupled to said host object data structure definer and said service object data structure definer and configured to create a connection object data structure linking said service object data structure to a host object data structure, said host object data structure corresponding uniquely to a user subscribing to said service, wherein said connection object data structure has a provisioning scheme indicating a limit on traffic sent to or from said service; and a traffic discarder coupled to said host object data structure definer and said connection object data structure creator and configured to discard traffic sent to or from said service that exceeds said limit.

13. An apparatus comprising:

a host object data structure definer configured to define a host object data structure corresponding uniquely to a user, said host object data structure having a provisioning scheme indicating a limit on traffic sent to or from said user;

a service object data structure definer configured to define a service object data structure corresponding uniquely to a service when a user logs in to said service;

a connection object data structure creator coupled to said host object data structure definer and said service object data structure definer and configured to create a connection object data structure linking said service object data structure to a host object data structure, said host object data structure corresponding uniquely to a user subscribing to said service, wherein said connection object data structure has a provisioning scheme indicating a limit on traffic sent to or from said service; and a traffic discarder coupled to said host object data structure definer and said connection object data structure creator and configured to discard traffic sent to or from said service that exceeds said limit.

14. An apparatus comprising:

a host object data structure definer configured to define a host object data structure corresponding uniquely to a user, said host object data structure having a provisioning scheme indicating a limit on traffic sent to or from said user;

a service object data structure definer configured to define a service object data structure corresponding uniquely to a service;

a connection object data structure creator coupled to said host object data structure definer and said service object data structure definer and configured to create a connection object data structure linking said service object data structure to a host object data structure, said host object data structure corresponding uniquely to a user subscribing to said service, wherein said connection object data structure has a provisioning scheme indicating a limit on traffic sent to or from said service, said connection object data structure creator further configured to create said connection object data structure using a service profile having an attribute describing provisioning parameters; and a traffic discarder coupled to said host object data structure definer and said connection object data structure creator and configured to discard traffic sent to or from said service that exceeds said limit.

15. The apparatus of claim 14, wherein said provisioning parameters include upstream bandwidth, upstream normal burst size, upstream excess burst size, downstream bandwidth, downstream normal burst size, and downstream excess burst size.

16. An apparatus comprising:

a host object data structure definer configured to define a host object data structure corresponding uniquely to a user, said host object data structure having a provisioning scheme indicating a limit on traffic sent to or from said user;

a service object data structure definer configured to define a service object data structure corresponding uniquely to a service;

a connection object data structure creator coupled to said host object data structure definer and said service object data structure definer and configured to create a connection object data structure linking said service object data structure to a host object data structure, said host object data structure corresponding uniquely to a user subscribing to said service, wherein said connection object data structure has a provisioning scheme indicating a limit on traffic sent to or from said service, said provisioning scheme implemented as token bucket provisioning; and a traffic discarder coupled to said host object data structure definer and said connection object data structure creator and configured to discard traffic sent to or from said service that exceeds said limit.

17. An apparatus comprising:

a host object data structure definer configured to define a host object data structure corresponding uniquely to a user, said host object data structure having a provisioning scheme indicating a limit on traffic sent to or from said user;

a service object data structure definer configured to define a service object data structure corresponding uniquely to a service;

a connection object data structure creator coupled to said host object data structure definer and said service object data structure definer and configured to create a connection object data structure linking said service object data structure to a host object data structure, said host object data structure corresponding uniquely to a user subscribing to said service, wherein said connection object data structure has a provisioning scheme indicating a limit on traffic sent to or from said service; and a traffic discarder coupled to said host object data structure definer and said connection object data structure creator and configured to discard traffic sent to or from said service that exceeds said limit, said apparatus further configured to receive said provisioning schemes through a remote subscriber management system.

* * * * *